Aug. 1, 1967  T. BUDZICH  3,333,416
HYDRAULIC STEERING SYSTEM
Filed Nov. 14, 1966
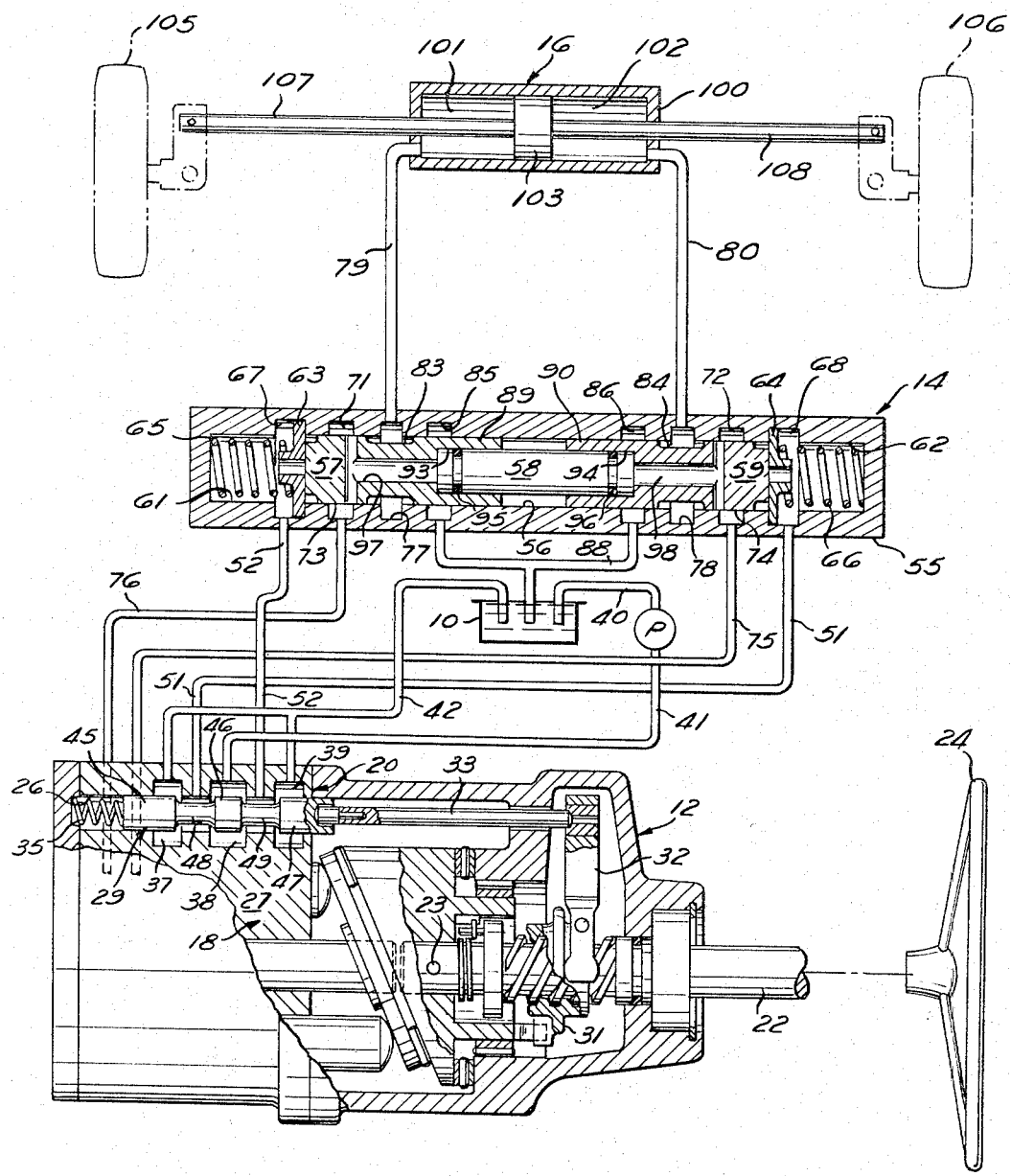
INVENTOR.
TADEUSZ BUDZICH
BY
McNENNY, FARRINGTON, PEARNE & GORDON
ATTORNEYS

United States Patent Office 3,333,416
Patented Aug. 1, 1967

3,333,416
HYDRAULIC STEERING SYSTEM
Tadeusz Budzich, Moreland Hills, Ohio, assignor to
The Weatherhead Company
Filed Nov. 14, 1966, Ser. No. 593,793
6 Claims. (Cl. 60—52)

This invention relates generally to hydraulic control systems and more particularly to hydrostatic vehicle steering systems.

Hydrostatic steering systems include a metering valve which is supplied with hydraulic fluid under pressure from a suitable pump and under action of the steering wheel directs the fluid to a hydraulic actuator motor which shifts the vehicle wheels. Unlike the power assisted type steering in which the actuator motor assists a mechanical linkage connected to the steering wheel, the hydrostatic system has no linkage and relies entirely on the fluid supplied to the actuator motor for the steering action.

Steering systems of this type, lacking the mechanical linkage, require two additional functions in order to have the necessary safety and reliability. First, they must provide some sort of a feedback or followup action so that the amount of movement of the vehicle wheels and movement of the actuator is proportional to the amount of movement of the steering wheel, so that after the steering wheel has been rotated through a given angular extent, the vehicle wheels move only through a similar proportional extent and further movement ceases when they reach a position corresponding to the position of the steering wheel. The second requirement is that there be some way to move the vehicle wheels in the event of a power failure such as a loss of fluid supply from the pump so that some sort of manual steering can be employed for emergency purposes to control the vehicle.

It has therefore been proposed to use a system in which rotation of the vehicle steering wheel actuates a metering valve to direct fluid from the pump to the actuator motor. The system also includes a feedback motor which is responsive to the fluid flow to or from the actuator motor and operates to restore the metering valve to the neutral position to indicate that the actuator motor has moved through the range of movement determined by the movement of the steering wheel. This system also uses a condition selector valve to interconnect the metering valve, the actuator motor, and the feedback motor to direct fluid flow in the proper sequence and to block off the actuator motor when the steering wheel is in the neutral position to prevent external forces from shifting the position of the actuator motor. Furthermore, this condition selector valve operates in the event of a failure of the fluid pressure supply to the metering valve so that rotation of the steering wheel is able to take up the lost motion connection for actuating the metering valve and operate the feedback motor as a pump, and the condition selector valve then controls the fluid flow in such a manner as to allow proper movement of the actuator motor.

Systems of the above type have been disclosed in the co-pending application of Eugene Bahniuk, Tadeusz Budzich and Jack L. Thompson, Ser. No. 492,819 filed Oct. 4, 1965 and in the co-pending application of Eugene Bahniuk and Jack L. Thompson, Ser. No. 503,808 filed Oct. 23, 1965. In the latter application, the condition selector or shuttle valve is in the form of an axially movable valve spool having three separate spool sections. Because the spools are all of the same diameter and because there is always a possibility of some leakage past the spools when the steering actuator motor reaches either limit of travel, such leakage can cause improper operation of the valve spool to produce a shifting of the valve spools that will change the direction of fluid flow and provide a kick back to the steering wheel caused by a reversal of the mode of operation of the system.

It is therefore the principal object of the present invention to provide a novel and improved selector valve for such a system. More particularly, in the selector valve of the present invention the axially sliding spool is made up of three separate spool sections, with the two end sections presenting substantially the same effective cross sectional areas to the normal pressures within the system but with the center section constructed so as to present a substantially smaller effective cross sectional area to the pressure from the feedback line during manual operation of the feedback motor as a pump. Because of the relative cross sectional areas of the three spool sections there is no tendency for the steering wheel to be kicked back by an inadvertent pressure build up in the feedback line during a hard turn.

This condition may occur with the selector valve of said co-pending applications during a power turn if the operator exerts manual effort on the steering wheel when the wheels are against the stops causing the feedback motor to operate as a pump with a resultant increase in the outlet pressure over the inlet pressure. When this condition occurs, a higher pressure is exerted upon the center section than upon the end sections. Since the center section of the present invention has a smaller effective cross sectional area exposed to the feedback pressure than the effective cross sectional area of the end section exposed to the normal pump pressure, the total force on the center section is less than that exerted on the end section. Therefore, there is no tendency for the end sections to separate and block off the normal supply of pressurized fluid from the pump to the feedback motor should the feedback motor be manually operated as a pump during a hard turn, a condition which would result in a pressure drop across the feedback motor and cause the steering wheel to kick back.

Additional features and advantages of the present invention will readily be apparent to those skilled in the art upon a more complete understanding of the preferred embodiment of the invention which is described in the following detailed description and shown in the accompanying drawing in which:

The sole figure is a partially schematic illustration of a hydraulic steering system incorporating the preferred embodiment of the selector valve of the present invention shown under neutral steering conditions.

Referring now to the figure in greater detail, the steering system includes a reservoir 10, a pump P, a feedback motor and metering valve assembly indicated generally at 12, a selector valve assembly 14, and an expansible chamber fluid motor 16. For the purpose of illustrating the present invention the selector valve assembly 14 has been shown as a unit separate from the combined feedback motor and metering valve assembly 12. However, it is to be understood that the feedback motor, metering valve, and selector valve may be incorporated into a single integrated steering unit or interconnected as separate components.

The feedback motor and metering valve assembly 12 includes a feedback motor indicated generally at 18 and a metering valve indicated generally at 20. The feedback motor 18 is of the rotary cam plate axial piston type and the metering valve 20 is of the axial sliding spool open center type. The steering shaft 22 is connected at one end to the feedback motor cam plate by a lost motion pin connection 23 and at the other end to a conventional steering wheel 24.

The metering or control valve 20 includes an axial bore 26 formed in the body portion 27 of the feedback motor 18 in which is slidably disposed a valve spool 29. The valve spool 29 is actuated by the rotation of the steering shaft 22 through an actuating mechanism comprising a screw driven cam nut 31 acting against a pivoted lever arm 32 and a push rod 33. The push rod 33 is maintained under compression by a spring 35 acting on the left end of the spool 29 to keep the lower end of the lever arm 32 in contact with the cam nut 31. The actuating mechanism for the metering or control valve 20 is shown and described in greater detail in the co-pending application of Eugene Bahniuk and Jack L. Thompson, Ser. No. 576,881, filed Sept. 2, 1966.

Spaced along the bore 26 in the body 27 are three enlarged annular grooves 37, 38 and 39. The center groove 38 is connected by a line 41 to the pump P and the two outer grooves 37 and 39 are connected by a common line 42 back to the reservoir 10. The spool 29 is provided with three lands 45, 46 and 47 spaced apart by spool grooves 48 and 49. Since the metering or control valve 20 is of the open center type, when the spool 29 is in its neutral position (as shown) the fluid from the pump P flows through the line 41 into the groove 38 and then around the lands 45, 46 and 47 and out of the metering valve 20 to the reservoir 10 through the line 42. However, when the steering wheel is turned either to the right or to the left, the spool is shifted axially. For a right hand turn the spool moves to the right blocking off the two grooves 37 and 39 allowing the pressurized fluid from groove 38 to flow out of the metering valve 20 through the line 51 to the right end of the selector valve assembly 14. When the steering wheel is turned to the left the spool 29 moves to the left and the pressurized fluid flows through the line 52 to the left end of the selector valve assembly 14.

The selector valve assembly 14 as shown includes a housing 55 having a longitudinal bore 56 within which is mounted a valve spool assembly comprising three axially slidable valve spools 57, 58 and 59. The two end spools 57 and 59 are identical, but turned end for end and separated by the center spool 58.

The lines 51 and 52 lead to respective chambers 62 and 61 at each end of the bore 56. Within these chambers are apertured plungers 63 and 64 biased inwardly by springs 65 and 66. The plungers 63 and 64 are provided with radial flanges which are confined within enlarged annular grooved portions 67 and 68, the walls of which function as stops to limit inward movement of the plungers under the action of the adjacent biasing springs and to limit outward movement of the associated one of the end spools 57 and 59. Fluid pressure acting on the end of one valve spool or the other will shift the valve spool assembly 57, 58 and 59 along the bore 56 until the opposite apertured plunger is moved to a stop position against the outer end wall of the associated one of the grooves 67 and 68.

A spaced distance inwardly of the grooves 67 and 68 are annular grooves 71 and 72, which in the neutral position as shown are blocked off by lands 73 and 74 on the end spools 57 and 59 respectively. The grooves 71 and 72 are connected to the feedback motor 18 through feedback lines 76 and 75, respectively. Inwardly of the grooves 71 and 72 are another pair of left and right grooves 77 and 78 connected by lines 79 and 80 to opposite ends of the expansible chamber fluid motor 16. Opposite the grooves 77 and 78 are spool grooves 83 and 84 on the end spools 57 and 59, respectively.

Inwardly of the grooves 77 and 78 are still another pair of anular drain grooves 85 and 86 which connect through a common drain line 88 back to the reservoir 10. In the neutral position these drain grooves 85 and 86 are blocked off by the wide lands 89 and 90 on the end spools 57 and 59, respectively.

The center spool 58 has a substantially smaller external diameter than the land portions 73, 74, 89 and 90 and is arranged with its end portions received within counterbores 93 and 94 in the end spools 57 and 59, respectively. These end portions are sealed within the counterbores 93 and 94 by annular sealing rings 95 and 96. Interconnecting the counterbores 93 and 94 with the feedback line grooves 71 and 72 are T-shaped passages 97 and 98 in the end spools 57 and 59, respectively. With this arrangement the effective cross sectional area of the center spool 58 exposed to pressurized fluid from the feedback lines 75 and 76 is substantially smaller than the effective area of the end spools 57 and 59 exposed to the pump pressure from the lines 51 and 52.

The expansible chamber fluid motor assembly 16 includes a cylinder 100 separated into two internal chambers 101 and 102 by a piston 103. A pair of piston rods 107 and 108 connect the piston 103 to the steerable wheels 105 and 106 of the vehicle. It will be understood that this expansible chamber fluid motor assembly may be of any conventional type used for moving one or more steerable wheels or other steering device in reversible directions for steering the vehicle. The lines 79 and 80 from the selector valve assembly 14 are connected to the chambers 101 and 102 respectively and alternately function as supply and drain lines for the expansible chamber fluid motor 16 during operation of the steering system.

During a right hand turn, with the steering system operating normally, fluid is drawn from the reservoir 10 through line 40 by the pump P and passes through line 41 into the groove 38 in the metering valve 20, past the land 46 and out of the metering valve 20 through line 51 to chamber 62 in the selector valve assembly 14. The pressurized fluid within chamber 62 then passes through the aperture in plunger 64 and acts upon the effective cross sectional area on the right end of the valve spool 59 to drive the valve spool assembly 57, 58 and 59 to the left within the bore 56 to a point where the plunger 63 bottoms against the outside wall of the groove 67. In this position the grooves 71 and 72 are uncovered by the lands 73 and 74 on the spools 57 and 59, respectively. From groove 72 the fluid is forced through line 75 to the feedback motor 18 and from the feedback motor through line 76 to groove 71. With the spool assembly 57, 58 and 59 shifted to the left communication between grooves 71 and 77 in the selector valve is established by spool groove 83 and the pressurized fluid is free to pass from groove 71 through line 79 to chamber 101 in the expansible chamber fluid motor 16. This drives the piston 103 to the right within the cylinder 100 and forces the fluid from chamber 102 through line 80, groove 78, spool groove 84, drain groove 86, and drain line 88 into the reservoir 10. During this normal operation of the steering system the center spool 58 of the selector valve spool functions only as a spacer to maintain the end spools 57 and 59 a predetermined distance apart.

Should a pressure failure occur cutting off the supply of pressurized fluid to the metering valve 20, the feedback motor 18 is manually driven as a pump by the steering shaft 22 through the lost motion connection 23. As the operator turns the steering wheel for a right turn, the feedback motor 18 then pumps fluid through line 76 to groove 71 in the selector valve 14. From groove 71, the pressurized fluid is forced through passage 97 in spool 57 and acts upon the effective cross sectional area on the left end of center spool 58 driving the two end spools 57 and 59 apart against the action of the springs 65 and 66 until the plungers 63 and 64 abut the outer sides of the grooves 67 and 68, respectively. When this happens, lands 73 and 74 are positioned to block off grooves 67 and 68 thereby establishing a closed fluid circuit between the feedback motor 18 and the expansible chamber fluid motor 16 through line 76, grooves 71, 83 and 77 and line 79 to chamber 101. The fluid within chamber 102 drains back to the feedback motor 18 through line 80, grooves 78, 84 and 72 and line 75 to provide a closed circuit independent of the pump and reservoir.

During a hard right turn under pump pressure operation, should piston 103 be moved all the way to the right in cylinder 100 and the operator continue to turn the steering wheel 24 to the right and take up the lost motion connection, the feedback motor 18 will then be operated as a pump. In this case, the pressure in line 76 will be increased above the inlet pressure to the feedback motor line 75. With the selector valve assembly of the present invention, this condition presents no problem; for, while the normal leakage between land 73 and the bore 56 will allow the increased pressure in groove 71 to act upon the left end of spool 58 through passage 97, the end spools 57 and 59 will not be driven apart. Since the effective cross sectional area on the left end of spool 58, exposed to the increased unit pressure within passage 97, is less than the effective cross sectional area on spool 59, exposed to the pressurized fluid within chamber 61 supplied by the pump P, the increased pressure within line 76 will not drive end spools 57 and 59 apart and cause land 74 to block off groove 72 from chamber 62. Therefore, a pressure drop will not occur across the feedback motor 18 between lines 76 and 75 which would cause the feedback motor to be suddenly reversed and kick the steering wheel 24 backward. Therefore, this particular problem has been eliminated by reducing the effective area forcing the spools 57 and 59 apart well below the areas acting to force the spools together as a unit in either direction.

While the preferred embodiment of this invention has been shown and described in detail, it is recognized that this invention is not limited to such specific details and other modifications and rearrangements may be resorted to by those skilled in the art in the light of this invention without departure from its scope as defined in the following claims.

What is claimed is:

1. A fluid pressure actuated selector valve comprising a housing defining a bore, a valve spool assembly slidably disposed within said bore, biasing means for biasing said valve spool assembly toward a centered position within said bore, said valve spool assembly and said bore having cooperating porting means for controlling fluid flow through said valve, said valve spool assembly comprising a pair of end spools and a center spool, first inlet means to admit fluid pressure to at least one end of said bore to shift said spools as a unit in said bore, second inlet means to admit fluid pressure to an intermediate point in said bore to shift said end spools away from each other, said end spools and said center spool being constructed and arranged so that the area exposed to the fluid pressure from said second inlet means is less than the area of said end spools exposed to the ends of said bore.

2. A valve as set forth in claim 1 wherein said center spool has end portions of lesser diameter than said bore, said end spools have counterbores therein adjacent said center spool to receive said center spool end portions in a sliding sealing fit, and passage means to admit fluid from said second inlet means into said counterbores.

3. A selector valve comprising a housing defining a bore having a plurality of axially spaced radial enlargements therealong, a valve spool assembly slidably disposed within said bore and having a plurality of axially spaced lands therealong adapted to selectively block off and open said radial enlargements as the valve spool assembly is shifted axially within the bore, biasing means for biasing said valve spool assembly towards a centered position within said bore, said valve spool assembly comprising a pair of end spools and a center spool, the adjacent ends of said end spools being of a given external diameter and having longitudinally extending counterbores formed therein, said center spool having end portions of a substantially smaller external diameter than said external diameter of said end spools, said end portions of said center spool being slidably and sealingly received within said counterbores, and passages means establishing fluid communication between said bore and said counterbores.

4. A valve as set forth in claim 3 wherein said passage means comprise a passage in each of said end spools.

5. In a hydraulic steering system having a reversible actuator motor, a rotatable input shaft, a source of fluid pressure, a reservoir, a metering valve operable by said input shaft to selectively connect said fluid pressure source to said actuator motor, a reversible positive displacement feedback motor operable to provide follow-up rotation for said metering valve and through a lost motion linkage for said input shaft, and a condition selector valve interconnecting said metering valve, said actuator motor and said feedback motor to direct fluid pressure from said metering valve to said feedback motor and from said feedback motor to said actuator motor and from said actuator to said reservoir, said selector valve having a bore and a sliding valve spool assembly in said bore including a pair of end spools and a center spool between said end spools, the effective cross-sectional area between said center spool and each of said end spools being substantially less than the effective cross-sectional area of said end spools on the sides away from said center spool, said valve spool assembly and said bore having cooperating porting means constructed and arranged so that upon actuation of said metering valve, the fluid from said fluid pressure source is applied to the ends of said valve spool assembly to shift said valve spool axially in said bore to interconnect said metering valve, said feedback motor and said actuator motor whereby said actuator motor is operated from said fluid pressure source, said porting means being arranged so that in the absence of fluid pressure from said pressure source and said metering valve, actuation of said feedback motor as a pump by said input shaft through said lost motion linkage will cause fluid pressure to be admitted into the area between said center spool and one of said end spools tending to force said end spools apart to interconnect said feedback motor, said selector valve and said actuator motor in a closed circuit to provide manually operated steering.

6. In a hydraulic steering system having a reversible actuator motor, a rotatable input shaft, a source of fluid pressure, a reservoir, a metering valve operable by said input shaft to selectively connect said fluid pressure source to said actuator motor, a reversible positive displacement feedback motor operable to provide follow-up rotation for said metering valve and through a lost motion linkage for said input shaft, and a condition selector valve interconnecting said metering valve, said actuator motor, and said feedback motor to direct fluid pressure from said metering valve to said feedback motor and from said feedback motor to said actuator motor and from said actuator motor to said reservoir, said selector valve having a bore and a sliding valve spool assembly in said bore including a pair of end spools and a center spool between said end spools, the adjacent end portions of said end spools having a longitudinally extending counterbore formed therein, said center spool having end portions thereon of an external diameter substantially smaller than the external diameters of the adjacent ends of said end spools, said end portions of said center spool being slidingly and sealingly received within said counterbores, each of said end spools having a passage therein establishing communication between its exterior and said counterbore whereby fluid pressure from said feedback motor acts upon the end face of the reduced end portion of said center spool during manual operation of the feedback motor as a pump through said lost motion linkage to disconnect the feedback motor from the metering valve and force the end spools apart to establish a closed fluid circuit between said feedback motor and said actuator motor, the effective cross-sectional area of said center spool end portions exposed to fluid pressure from said feedback motor being substantially less than the effective cross-sectional areas of said end spools exposed to fluid pressure through said metering valve so that the total force exerted upon said center spool by fluid pressure from said feedback motor will be less than the total force exerted upon either end spool by said fluid pressure source during normal operation of said steering system thereby preventing said end spools from being driven apart by the inadvertent manual operation of said feedback motor as a pump.

References Cited

UNITED STATES PATENTS

| | | | |
|---|---|---|---|
| 2,808,120 | 10/1957 | Hunter | 180—79.2 |
| 2,918,135 | 12/1959 | Wittren | 60—52 |
| 2,954,756 | 10/1960 | Donner et al. | 91—388 |
| 3,016,708 | 1/1962 | Gordon et al. | 60—52 |
| 3,209,541 | 10/1965 | Dunphy | 60—52 |

EDGAR W. GEOGHEGAN, *Primary Examiner.*